United States Patent Office 3,165,735
Patented Jan. 12, 1965

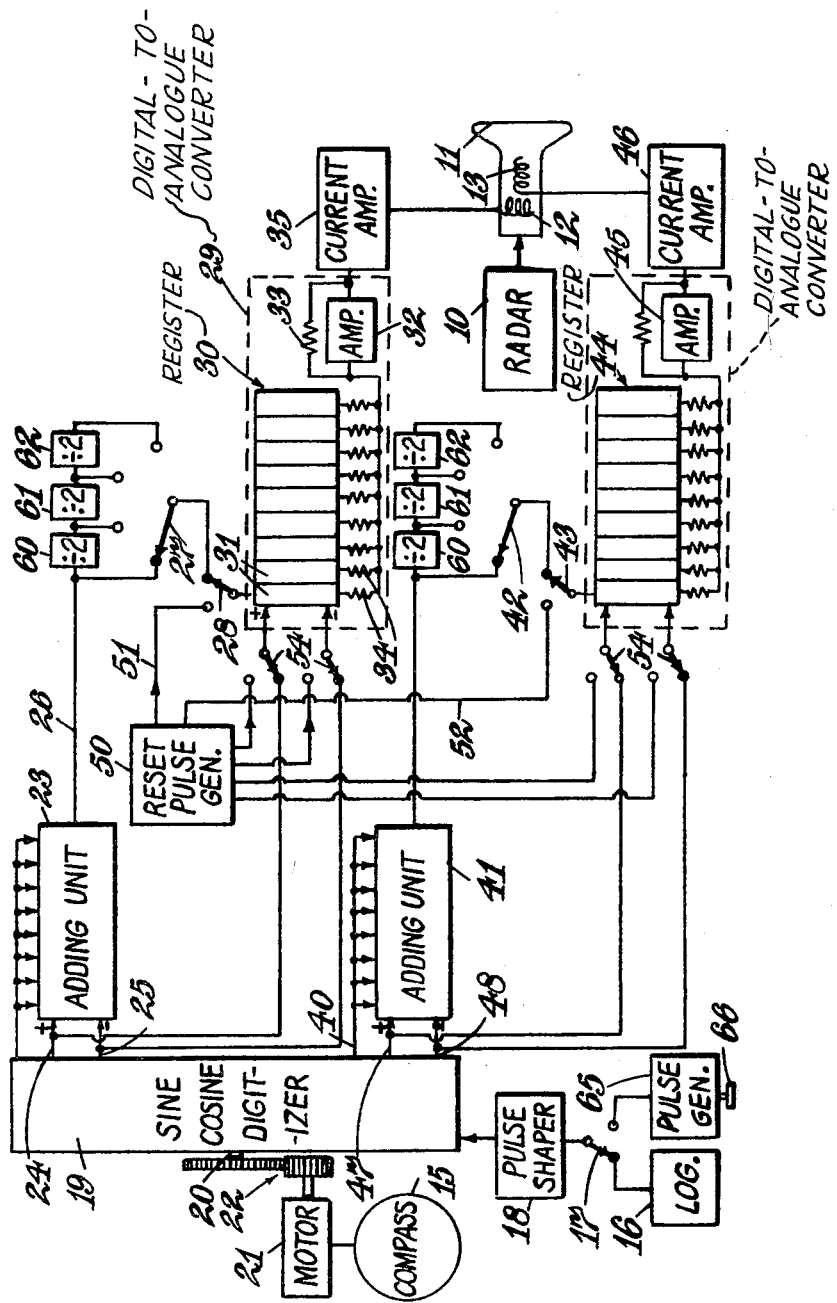

3,165,735
RADAR DISPLAY APPARATUS
Douglas Arthur Aylett, London, England, assignor to Decca Limited, London, England, a British company
Filed Mar. 29, 1963, Ser. No. 269,060
Claims priority, application Great Britain, Apr. 2, 1962, 12,560/62
19 Claims. (Cl. 343—5)

This invention relates to radar display apparatus for use on mobile craft.

On mobile craft such as ships, it is often required to provide a radar display, of the kind known as a true motion display, in which the responses indicating the various distant targets seen by the radar apparatus move across the display screen in accordance with the actual motions of those targets and not merely in accordance with the relative motion with respect to the craft carrying the radar apparatus. This is achieved by displacing the display on the display screen in accordance with the actual motion of the radar-carrying craft. It will be convenient in the following description to refer more specifically to a cathode ray tube providing a display for visual observation but it will be understood that such true motion displacement of an image may also be used on a cathode ray tube for photographic recording or on a storage tube on which the information is stored for reading out subsequently for use in conjunction with other information or other similar purposes. Deflection signals for displacing the display in accordance with the motion of the craft are most conveniently applied as separate signals to two orthogonal deflector means, e.g. deflection coils, giving deflections of the cathode ray beam in two orthogonal directions. The signals in this case have therefore to be proportional to the integrated components of motion of the craft in the two directions.

In order to provide the true motion information it is usual to make use of a compass for providing information about the heading of the craft and a log or equivalent device for providing information about the distance travelled by the craft. For marine craft it is the common practice to use a log providing electrical output pulses representative of discrete distances of movement, for example each ten yards of movement. Heretofore it has been the practice in true motion radar systems to employ either an electro-mechanical system for converting the electrical pulses from the ship's log into a mechanical displacement which is mechanically resolved into sine and cosine components which are then separately integrated mechanically or alternatively to employ an electronic analogue resolving system for producing the resolved components as electrical signals which are then integrated electrically to provide signals for feeding directly to or for controlling inputs to the deflector means. The electro-mechanical system has the disadvantage that mechanical resolvers are precision devices requiring very careful manufacture and critical adjustments. Electronic devices for providing the integrated resolved components have the disadvantage that they require very high quality components and careful adjustment because of the very long electrical time constants of integration, which may be of many hours.

According to the present invention, in radar display apparatus for a mobile craft, there are provided a sine-cosine digitizer set in accordance with the direction of movement of the craft and arranged to provide, on receipt of an input signal, outputs in digital form representative of the sine and cosine of the input setting, means for applying input signals to said sine-cosine digitizer periodically at time intervals corresponding to units of distance travelled by the craft, separate adding means for summing respectively the sine and cosine components from the digitizer and digital-to-analogue conversion means for converting the two summed components into analogue signals representative of the required displacements of the display. For a marine craft, the input signals to the digitizer may be pulses from a ship's log but as is well known for true motion radar equipment, provision may be made for providing equivalent pulses from a separate controllable pulse generator which can be manually set to provide pulses representative of any rate of movement of the craft required. These pulses are merely trigger pulses for causing the digitizer to feed signals to the adding means and thus the duration or shape of the pulses is now immaterial within wide limits. The angular setting of the digitizer may be controlled by a compass and provision may be made for manual adjustment if required. Conveniently the digitizer may comprise a sine-cosine digital resolving disc. The outputs of the digitizer will represent the sine and cosine components of the distance travelled for each unit input. These components are fed into said adding means which effect addition or subtraction according to the sign of the component output signal so as to integrate the two components separately. The adding means may typically comprise a series of bi-stable units, for example flip flops. In a typical example the outputs from the digitizer may be eight bits in a binary code and thus the two outputs are the sine of the compass angle multiplied by $2^8$ expressed in binary code.

In such an arrangement the outputs from the adding means would, for the digits of lesser significance, generally be very much smaller than are required for steps of deflection of the beam of a cathode ray tube as they would represent deflections very much smaller than the spot size. Conveniently therefore the aforementioned adding means are summing units arranged, each time the summed total reaches a predetermined value, to give an output signal and means are provided for feeding these output signals, for each co-ordinate direction, to an input register constituting an accumulator in the aforementioned digital-to-analogue conversion means.

Conveniently the adding means are bi-directional counters and the sine-cosine digitizer is arranged to give not only output signals representative in binary form of the numerical values of the sine and cosine components but also additional signals representative of the signs of these outputs. These additional signals may be fed into the aforementioned adding means to control the operation thereof to effect addition or subtraction as necessary and these sign signals may also be fed to the digital-to-analogue conversion means so that the outputs from the adding means are added or subtracted as appropriate from the accumulated totals in the registers in the digital-to-analogue conversion means. These registers each constitute a bi-directional counter in the form of an accumulator summing the total output signals from the appropriate component adding means, adding or subtracting units of input as necessary. These accumulators might typically each comprise a series of bi-stable units for example flip-flops and in a typical construction nine such bi-stable units might be provided for each register to give a store of 512 bits.

On radar display apparatus it is the usual practice to provide alternative displays to a series of different scales which can be selected by means of a range scale switch. True motion facilities are not required on long range displays and typically it might be required to provide true motion off-centering for four different range scales in which the radius of the display screen corresponds to distances of 1.5, 3, 6 and 12 miles. Means may be provided coupled to the range scale switch for automatically controlling the magnitude of the outputs from the digital-to-analogue converters in accordance with the selected range scale so that the extent of the off-centering deflection is appropriate to the selected range scale. It is convenient therefore to effect the adjustment automatically by dividing down the inputs to the digital-to-analogue converters rather than the outputs. It is the standard practice that the various successive different scales should have range scales differing in the ratios of two to one. Provided the successive scales are in this ratio, it is merely necessary to provide a series of two to one dividers for dividing the outputs of the aforementioned adding means summing the sine and cosine component signals before these outputs are fed to the registers in the digital-to-analogue converters. Such division by two is readily effected in a binary system and thus all that is necessary is that, on the largest scale display, that is to say the display with the smallest maximum range, all the output pulses from each of said adding means are fed to the digital-to-analogue converters and, on the next display scale, only alternate pulses are fed and so on.

For re-setting the off-centre position, means may be provided for injecting pulses directly into the digital-to-analogue conversion means. The pulses may be added or subtracted from the accumulated totals in the registers in these converters as required and the re-setting may be controlled by push-buttons or by a rolling ball digitizer.

The following is a description of one embodiment of the invention reference being made to the accompanying drawing which is a block diagram illustrating a true motion radar display system for use on a ship.

Referring to the drawing there is illustrated diagrammatically radar apparatus 10 having a cathode ray display tube 11 on which is displayed a plan position radar display. The radar apparatus may be of conventional form and will not be described in further detail. The present invention is concerned with such apparatus installed on a mobile craft and is directed more particularly to the off-centering of the display in accordance with the motion of the radar-carrying craft so as to obtain what is commonly called a "true motion" display on the cathode ray tube 11. In the arrangement shown in the drawing, this off-centering of the display on the cathode ray tube is effected by means of orthogonal deflection coils 12, 13 which are fed with signals in a manner to be described later.

The arrangement illustrated is for use on a ship; the direction of heading of the ship is determined by a compass 15 and the motion of the ship through the water is determined by a log 16. In this particular embodiment an electrical log is used of the kind producing a pulse for each unit of distance travelled through the water. Such logs are typically arranged to produce one pulse for each 30 feet of movement. The pulses from the log are fed via a switch 17 to a pulse shaping unit 18 which converts each pulse from the log into a pulse of rectangular waveform and of known duration. The pulses from the pulse shaper are fed to a sine-cosine digitizer 19 which, on receipt of each pulse from the pulse shaper, provides two separate outputs representative respectively of the sine and the cosine of the angular position of an input shaft 20 for the digitizer. Typically the digitizer may comprise a digit disc or discs having eight tracks engaging sensing means for the sine output and another eight tracks for the cosine output so providing, for each of these outputs an eight bit binary coded signal representative of the angular position of the disc. The shaft 20 is rotated to remain in correspondence with the compass heading of the vehicle by means of compass repeater motor 21 and gearing 22 driving the shaft 20.

Considering the sine output from the digitizer and assuming that it has eight bits of information, this output is fed into an adding unit 23 which consists of eight flip-flops (that is to say bi-stable devices) arranged to form a bi-directional counter. The eight flip-flops correspond respectively to eight digits of gradually increasing significance and the eight outputs representing the sine component from the digitizer are fed into the respective flip-flops to add to or subtract from the information previously stored in the adding unit and represented by the existing states of these flip-flops. The digit disc providing the sine output also provides signals on one or other of two leads 24, 25 to indicate the sign of the output and these leads 24, 25 control the direction of count of the adding unit 23 that is to say whether the coded sine signals from the digit disc are added or subtracted. For a positive signal the input sine information is added to the total in the adding unit whereas for a negative output the input information is subtracted from the total in the adding unit. If the log 16 gives an output pulse for each 30 feet of travel of the craft, the most significant digit in the adding unit 23 will correspond to a distance of travel of half this distance namely 15 feet. Steps of less than 15 feet are so small that, on the display scales such as are used in marine radar, they would call for deflections of the cathode ray tube beam which are very much smaller than the spot size. Conveniently therefore the adding unit 23 is arranged to provide an output each time the sum total reaches a predetermined value and in the particular arrangement illustrated in the drawing, the carry from the stage of most significance in the adding unit 23 is employed and is fed out on an output lead 26. Such a pulse corresponds to a distance of 30 feet. This pulse is fed via a switch 27 and a switch 28 to a digital-to-analogue conversion unit 29. In this particular embodiment the digital-to-analogue conversion unit 29 comprises a register 30 having nine flip-flops 31. This register is arranged as a bi-directional accumulator to sum the total number of pulses received, the pulses being fed into the flip-flop of least significance at one end of the register. The register 30 accumulates the total number of pulses and it has to take into account the sign of the output from the adding unit 23. This output from the adding unit 23 is additive or subtractive according to the sign of the corresponding output from the digitizer 19 and the signals on the leads 24, 25 are therefore fed also to the register 30 to control the direction of count. The accumulated total in the register 30 is converted into an analogue voltage by means of a high gain amplifier 32 having a feedback resistor 33 and a plurality of input resistors 34 which are connected to receive signals representative of the conditions of the respective flip-flops 31. The magnitudes of the various resistors 34 are arranged according to the significance of the outputs from the various flip-flop units so that the amplifier 32 will, in the known manner give an analogue output voltage which is proportional to the accumulated binary digital total in the register 30. This output voltage is fed to a current amplifier 35 and thence to one of the off-centering deflection coils 12 of the cathode ray tube 11.

The coosine output from the digitizer 19 is treated in a manner similar to the sine output and is fed via a lead 40 as eight bits of information into an adding unit 41 the output of which is fed via switches 42 and 43 into a register 44 in the form of a bi-directional counter. The outputs from the nine flip-flops constituting this register are fed through resistors into an amplifier 45 and thence to a current generator 46 and so to the other deflection coil 13 for off-centering the display on the cathode ray tube 11. The digitizer 19 also provides outputs representative of the sign of the cosine output on leads 47, 48 and these are used to control the direction count in the adding unit 41 and register 44 in a similar manner to the sign outputs on leads 24, 25.

It will be seen that the apparatus thus far described makes use of the digitizer 19 to resolve the distance signal represented by each successive pulse from the log 16 into sine and cosine components in accordance with the direction of heading of the craft and the sine and cosine components are accumulated in the adding units 23 and 41. For each 30 feet of distance in a component direction, a signal is fed into the appropriate one of the registers 30 and 44 so increasing or decreasing the accumulated total in this register. These registers thus store in binary form the total motion of the craft in the two component directions. The totals in these two registers are converted into analogue form and control the currents through the off-centering coils, 12, 13 so that the display on the cathode ray tube screen is off-centered in the two co-ordinate directions in accordance with the accumulated total in the registers 30, 44.

In true motion radar displays, it is necessary periodically to re-set the display when the position of the radar-carrying craft of the display screen has moved so far towards one edge of the display that it is no longer possible to see on the display for a sufficient area in the region ahead of the radar-carrying craft. In the arrangement shown in the drawing this re-setting is effected by altering the accumulated totals in the registers 30 and 44. These totals have to be altered to quantities corresponding to the required position to which the display is to be re-set. There are many ways in which this can be done and for example push-button switch means might be provided which re-set all the flip-flops in the registers 30 and 44 to some predetermined value. In this particular arrangement illustrated in the drawing however there is provided a re-set pulse generator 50 which conveniently is a freely mounted rotating ball frictionally engaging two discs at the ends of orthogonal diameters such as is described in the specification of U.S. application No. 147,026. Each disc drives a pulse generator for generating a series of pulses as the disc is rotated. This rolling ball device thus generates two series of pulses on two output leads 51, 52 corresponding to the sine and cosine of the direction of rotation of the ball with respect to the orthogonal axes of the discs engaging the ball. The number of pulses depends on the extent of rotation of the ball and such a ball may readily be spun in any required direction to generate two trains of pulses which can be fed into the registers 30 and 44 respectively for re-setting these registers to any total. The re-setting would normally be controlled merely by spinning the ball and watching the display screen, the ball being spun in the appropriate direction until the display is in the right position. It will be understood that in general there is no critical requirement as to the position to which the display is re-set and it is merely necessary to displace the display so that the position of the radar-carrying craft is in some more convenient position on the display screen. The pulses on the leads 51, 52 are fed into the registers 30, 44 via the aforementioned switches 28, 43 which enable the re-set pulse generator 50 to be connected to feed these registers. As with the digitizer 19, the re-set pulse generator may be arranged to provide signals representative of the direction of the sine and cosine components and these are fed to the appropriate directional controls for the registers 30, 44 by means of switches 54 which are ganged with the aforementioned switches 28, 43.

On marine radar apparatus it is usual to provide alternative displays to a series of different range scales such that the radius of the display screen corresponds to distances which, for the successive scales, are each double that of the preceding scale. The off-centering has to be effected at a rate in accordance with the selected range scale and, in the arrangement illustrated in the drawing, the outputs on the leads from the adding units 23, 41 are fed to a series of dividers 60, 61, 62 each dividing by two and the switches 27, 42 are arranged to select either the direct outputs from the adding units 23, 41 or the outputs from the dividers 60 or 61 or 62, the selection being effected automatically in accordance with the range scale selection by ganging the switches 27, 42 with the range scale selection switch on the radar apparatus. It will be seen that, for example, if the outputs from the divider 60 are selected, then only half the number of pulses will be fed into the registers 30, 44 compared with the condition if the outputs from the adding units 23, 41 were fed directly into these registers. Thus the change in the off-centering deflection due to the changes in the accumulated totals in the registers 40, 44 will now only be half what they were formally for each pulse from the log 16.

For some purposes, instead of using the log 16 it may be preferred to use artificially generated pulses corresponding to units of distance travelled and for this purpose there is provided an artificial log 65 which can be switched into circuit by the switch 17 in place of the log 16 and which provides a series of pulses at an adjustable repetition frequency. This frequency most conveniently is controlled by a control knob 66 having a pointer traversing a scale calibrated in terms of speed. Such an artificial log may be used for example where there is a strong tidal current and where it is desired to control the off-centering, not in accordance with the motion of the ship through the water, but in accordance with an estimated motion of the ship over the ground. If necessary, means, not shown, may be provided for manually adjusting the position of the shaft 20 of the digitizer to correspond to some predetermined track instead of the compass heading of the craft if there is any significant difference between the heading of the craft and the track made good.

I claim:

1. Radar display apparatus for a mobile craft wherein there are provided a sine-cosine digitizer having a rotatable input member to resolve an input signal in accordance with the angular setting of said input member, means for setting said input member in accordance with the heading of the craft and arranged to provide, on receipt of an input signal, outputs in digital form representative of the sine and cosine of the input setting, means for applying input signals to said sine-cosine digitizer periodically at time intervals corresponding to units of distance travelled by the craft, separate adding means for summing respectively the sine and cosine components from the digitizer and digital-to-analogue conversion means for converting the two summed components into analogue signals.

2. Radar display apparatus as claimed in claim 1 and for use in a ship wherein said means for applying input signals to the digitizer comprises a log generating electrical signals representative of units of distance travelled through the water.

3. Radar display apparatus as claimed in claim 2 wherein adjustable signal generator means are provided for applying repetitive pulses at an adjustable rate to the digitizer in place of the pulses from said log.

4. Radar display apparatus as claimed in claim 1 wherein the angular setting of the digitizer is controlled by a compass.

5. Radar display apparatus as claimed in claim 1 wherein each of said adding means is a summing unit arranged, each time the summed total reaches a predetermined value, to give an output signal and wherein means are provided for feeding these output signals, for each co-ordinate direction, to an input register constituting an accumulator in said digital-to-analogue conversion means.

6. Radar display apparatus as claimed in claim 1 wherein adjustable means are provided for dividing down in a selected ratio the inputs to the digital-to-analogue conversion means from the adding means.

7. Radar display apparatus for a mobile craft wherein there are provided, a compass, a sine-cosine digitizer controlled by said compass to be set in accordance with the heading of the craft and arranged to provide, on receipt of an input signal, outputs in digital form representative of the sine and cosine of the input setting and also outputs representative of the signs of the sine and cosine outputs, means for applying input signals to said sine-cosine digitizer periodically at time intervals corresponding to units of distance travelled by the craft, first and second bi-directional counters arranged to add input digital information to or subtract input digital information from a cumulative total in accordance with signals controlling the direction of count, means for feeding said sine and cosine outputs, one to each of said two counters, means for feeding said outputs representative of the signs to the respective counters to control the direction of count, and digital-to-analogue conversion means for converting at least the most significant digits in the cumulative totals in said counters into analogue signals.

8. Radar display apparatus for a mobile craft wherein there are provided, a compass, a sine-cosine digitizer controlled by said compass to be set in accordance with the heading of the craft and arranged to provide, on receipt of an input signal, outputs in digital form representative of the sine and cosine of the input setting and also outputs representative of the signs of the sine and cosine outputs, means for applying input signals to said sine-cosine digitizer periodically at time intervals corresponding to units of distance travelled by the craft, first and second bi-directional counters arranged to add input digital information to or subtract input digital information from a cumulative total in accordance with signals controlling the direction of count, means for feeding said sine and cosine outputs, one to each of said two counters, means for feeding said outputs representative of the signs to the respective counters to control the direction of count, third and fourth bi-directional counters, means for feeding a signal from said first and second bi-directional counters respectively to said third and fourth bi-directional counters each time the accumulated total in each of said first and second bi-directional counters respectively exceeds a predetermined value, means for feeding said outputs representative of the signs to the respective third and fourth counters to control the direction of count, and digital-to-analogue conversion means for converting at least the most significant digits in the cumulative totals in said third and fourth counters into analogue signals.

9. Radar display apparatus as claimed in claim 8 wherein adjustable divider means are provided in each of the feeds from the first and second counters to the third and fourth counters for altering the relationship between the accumulated totals in each of the first and second counters and the number of signals fed to the third and fourth counters.

10. Radar display apparatus as claimed in claim 8 wherein means are provided for manually re-setting said third and fourth counters.

11. Radar display apparatus as claimed in claim 8 wherein means are provided for injecting pulses into said third and fourth counters to re-set these counters to required totals.

12. Radar display apparatus for a mobile craft wherein there are provided a compass, a sine-cosine digitizer controlled by said compass to be set in accordance with the heading of the craft and arranged to provide, on receipt of an input signal, outputs in digital form representative of the sine and cosine of the input setting, means for applying input signals to said sine-cosine digitizer periodically at time intervals corresponding to units of distance travelled by the craft, separate adding means for summing respectively the sine and cosine components from the digitizer and digital-to-analogue conversion means for converting the two summed components into analogue signals.

13. Radar display apparatus for a mobile craft arranged to provide a plan position display wherein there are provided a compass, a sine-cosine digitizer controlled by said compass to be set in accordance with the heading of the craft and arranged to provide, on receipt of an input signal, outputs in digital form representative of the sine and cosine of the input setting, means for applying input signals to said sine-cosine digitizer periodically at time intervals corresponding to units of the distance travelled by the craft, separate adding means for summing respectively the sine and cosine components from the digitizer and arranged, each time the summed total reaches a predetermined value to give an output signal, means for feeding these output signals, for each coordinate direction, to an input register comprising a series of bistable units corresponding to a series of successive binary digits of different significance, separate digital to analogue conversion means for converting the respective totals in the input registers into analogue signals each comprising a high gain amplifier having a negative feedback circuit and plurality of input resistors, each resistor being connected to a bistable unit in the respective input register to receive signals representative of the condition thereof, and having a value proportional to the significance of the outputs from the respective bistable unit.

14. Radar display apparatus for a mobile craft comprising a radar unit providing output information representative of a plan position display, a display tube arranged to display said plan position information, a compass, a sine-cosine digitizer controlled by said compass to be set in accordance with the heading of the craft, and arranged to provide, on receipt of an input signal, outputs in digital form representative of the sine and cosine of the input setting, means for applying input signals to said sine-cosine digitizer periodically at time intervals corresponding to units of distance travelled by the craft, separate adding means for summing respectively the sine and cosine components from the digitizer and arranged each time the summed total reaches a predetermined value to give an output signal, means for feeding these output signals, for each coordinate direction, to an input register comprising a series of bistable units corresponding to a series of successive binary digits of different significance, separate digital to analogue conversion means for converting the respective totals in the input registers into analogue signals representative of the displacement of said craft in the two coordinate directions each comprising a high gain amplifier having a negative feedback circuit and a plurality of input resistors, each resistor being connected to a bistable unit in the respective input register to receive signals representative of the condition thereof and having a value proportional to the significance of the signals from the respective bistable unit, and orthogonal deflector means in said display tube to offset the display in accordance with the analogue signals representative of the total displacement of the craft in the said coordinate directions.

15. Radar display apparatus for a mobile craft having a display tube arranged to provide a plan position display wherein there are provided a compass, a sine-cosine digitizer controlled by said compass, to be set in accordance with the heading of the craft and arranged to provide, on receipt of an input signal, outputs in digital form representative of the sine and cosine of the input setting, means for applying input signals to said sine-cosine digitizer periodically at time intervals corresponding to units of distance travelled by the craft, separate adding means for summing respectively the sine and cosine components from the digitizer, digital-to-analogue conversion means for converting the two summed components into analogue signals and means for feeding said analogue signals to deflector means in said display tube to offset the plan position display in accordance with the summed components of displacement of the craft in the two coordinate directions.

16. Radar display apparatus for a mobile craft having a display tube arranged to provide a plan position display wherein there are provided a compass, a sine-cosine digitizer controlled by said compass to be set in accordance with the heading of the craft and arranged to provide, on receipt of an input signal outputs in digital form representative of the sine and cosine of the input setting, means for applying input signals to said sine-cosine digitizer periodically at time intervals corresponding to units of distance travelled by the craft, separate adding means for summing respectively the sine and cosine components from the digitizer, digital to analogue conversion means for converting the two summed components into analogue signals, means for feeding said analogue signals to deflector means in said cathode ray tube to offset the plan position display in accordance with the summed components of displacement in the two co-ordinate directions and means for injecting pulses directly into the digital-to-analogue conversion means for resetting the offset display.

17. Radar display apparatus for a mobile craft having a display tube arranged to provide a plan position display and adjustable means for altering the range scale of said display, wherein there are provided a compass, a sine-cosine digitizer controlled by said compass to be set in accordance with the heading of the craft and arranged to provide, on receipt of an input signal outputs in digital form representative of the sine and cosine of the input setting, means for applying input signals to said sine-cosine digitizer periodically at time intervals corresponding to units of distance travelled by the craft, separate adding means for summing respectively the sine and cosine components from the digitizer and arranged to provide an output each time the summed total reaches a predetermined value, dividing means automatically operated by said adjustable range setting means for dividing down in a selected ratio the outputs from said adding means, digital-to-analogue conversion means for converting the two resulting outputs from said dividing means into analogue signals representative of the total displacement of the craft in the two co-ordinate directions, and means for feeding said analogue signals to deflector means in said display tube to offset the plan position display in accordance with the summed components of displacement of the craft in the two co-ordinate directions.

18. Radar display apparatus as claimed in claim 17 wherein said adjustable range setting means has a series of different range scales such that the radius of the display screen in each scale corresponds to a distance double that in the preceding scale and wherein, for each co-ordinate direction, said dividing means comprises a set of inhibitor means in series, each inhibitor means being arranged to inhibit alternate pulses the number of inhibitor means being automatically selected in accordance with the range scale set by said adjustable range setting means.

19. In radar display apparatus for a mobile craft providing a plan position display which is displaced across a display screen in accordance with the motion of the craft to give a true motion display, the combination of a sine-cosine digitizer providing output signals corresponding to the sine and cosine components of an input signal resolved in an angular direction determined by the setting of a input element, means for setting said input element in accordance with the direction of motion of the craft, means for applying input signals to said sine-cosine digitizer periodically at time intervals corresponding to units of distance travelled by the craft, separate adding means for summing respectively the sine and cosine components from the digitizer and digital-to-analogue conversion means for converting the two summed components into analogue signals representative for effecting said displacement of the display across the display screen.

References Cited by the Examiner
UNITED STATES PATENTS

| | | | |
|---|---|---|---|
| 3,007,152 | 10/61 | Simmons et al. | 343—5 |
| 3,007,153 | 10/61 | Aylett | 343—5 |
| 3,085,241 | 4/63 | Moore | 343—5 |
| 3,114,908 | 12/63 | Hall | 343—5 |

FOREIGN PATENTS

| | | |
|---|---|---|
| 882,905 | 11/61 | Great Britain. |
| 907,890 | 10/62 | Great Britain. |
| 603,691 | 4/60 | Italy. |

CHESTER L. JUSTUS, *Primary Examiner.*